United States Patent Office 3,613,453
Patented Oct. 19, 1971

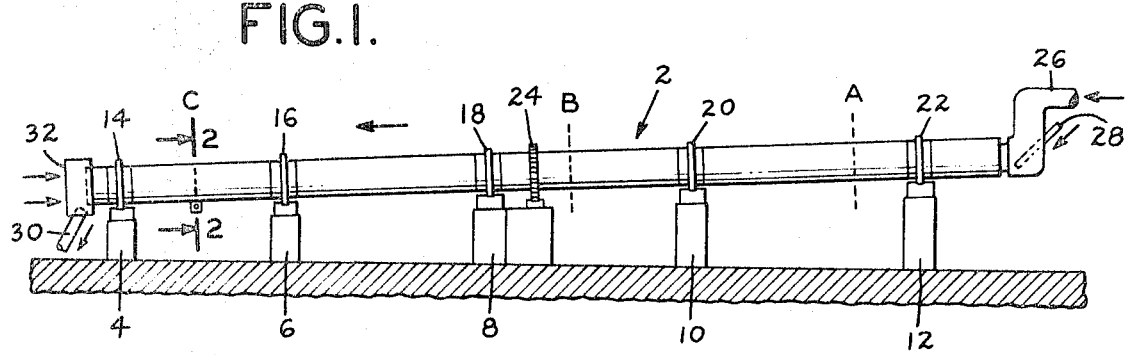
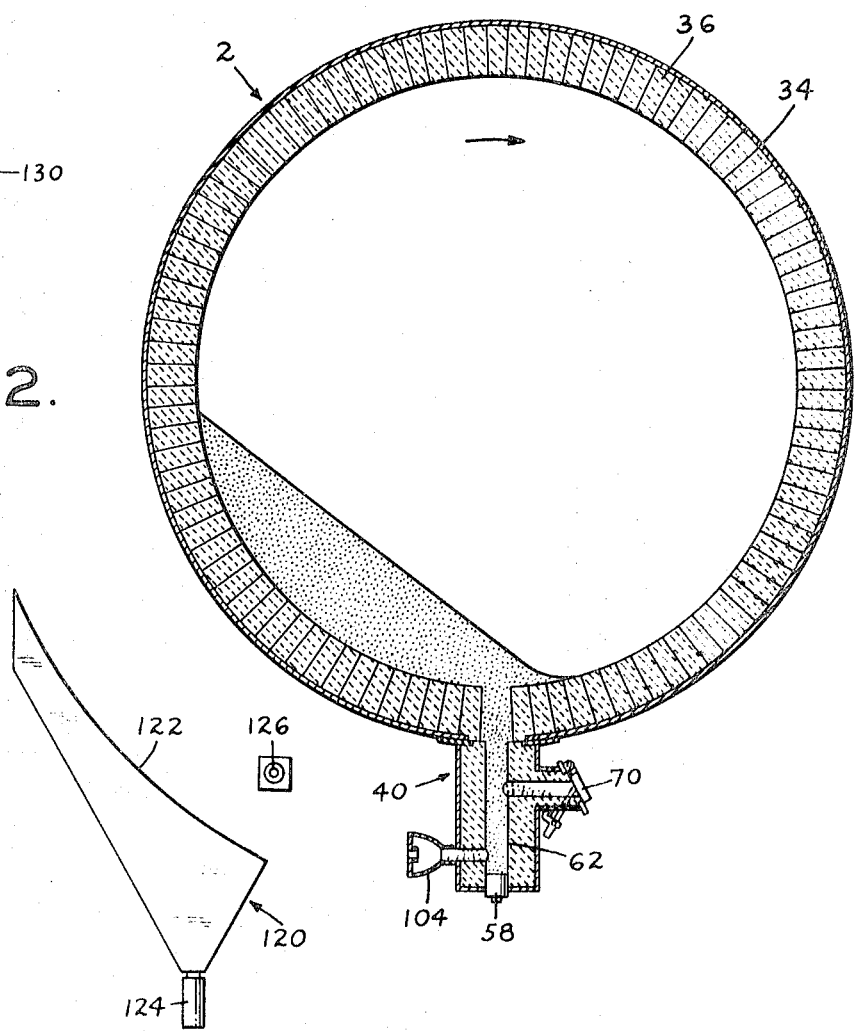

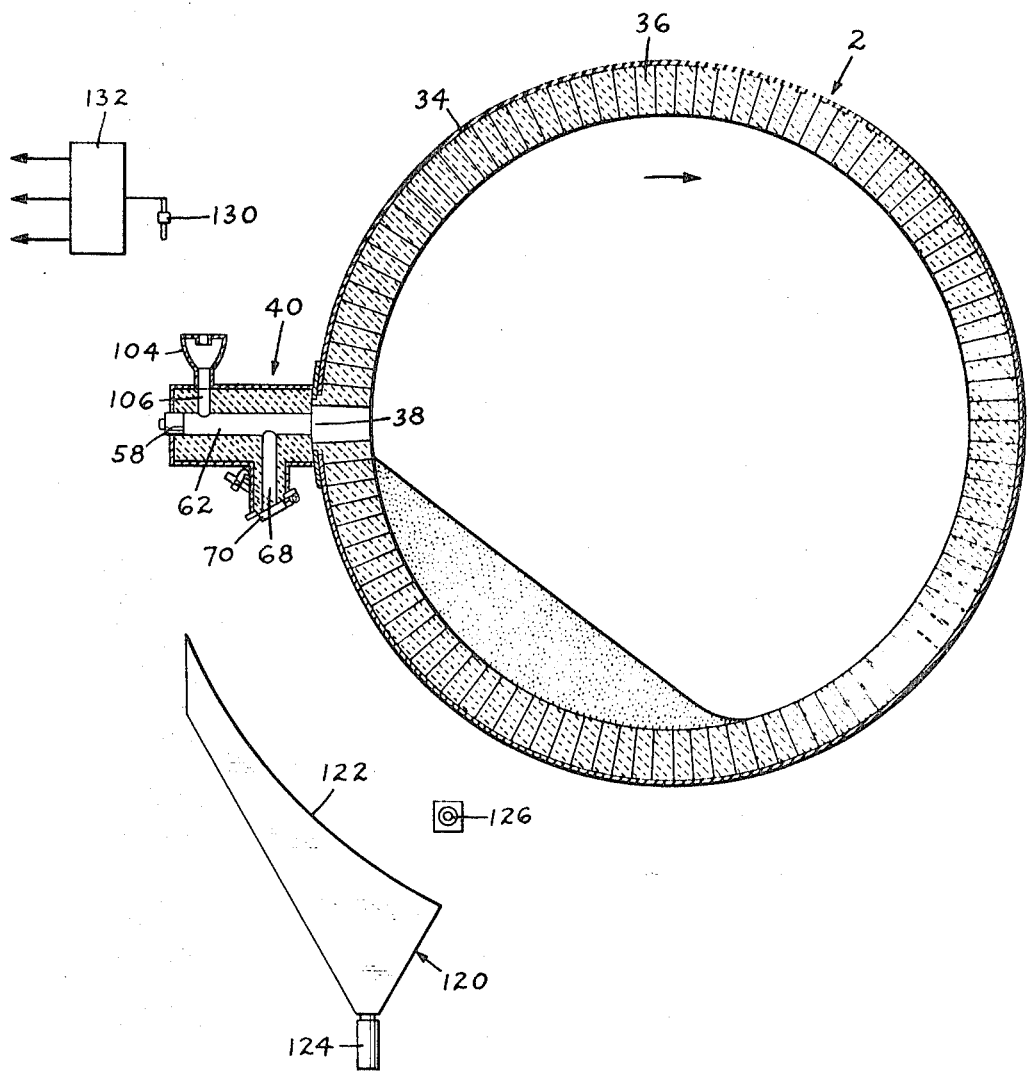

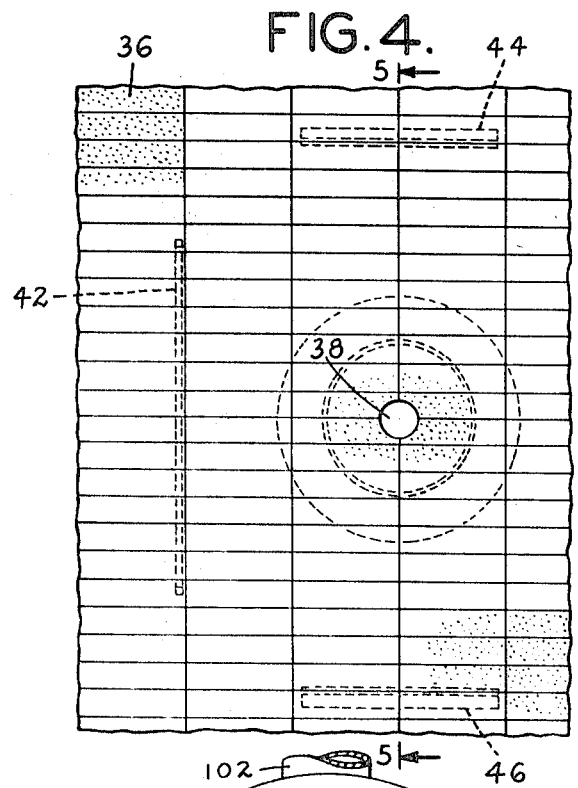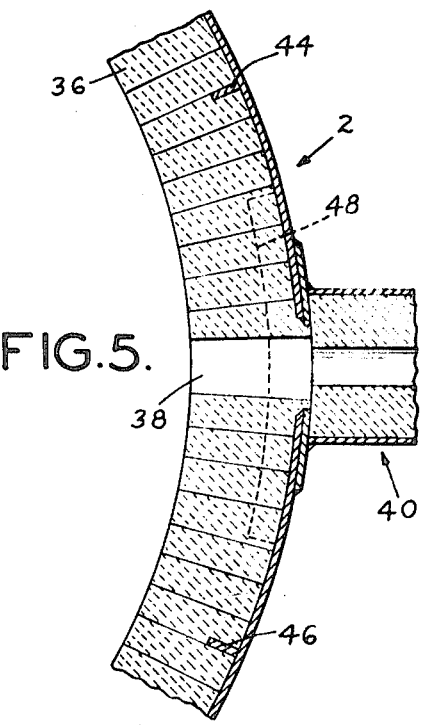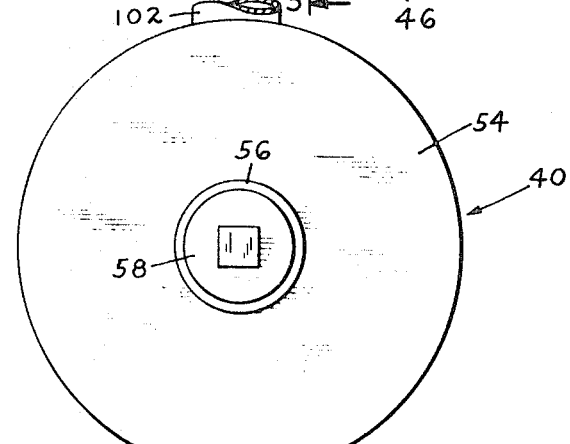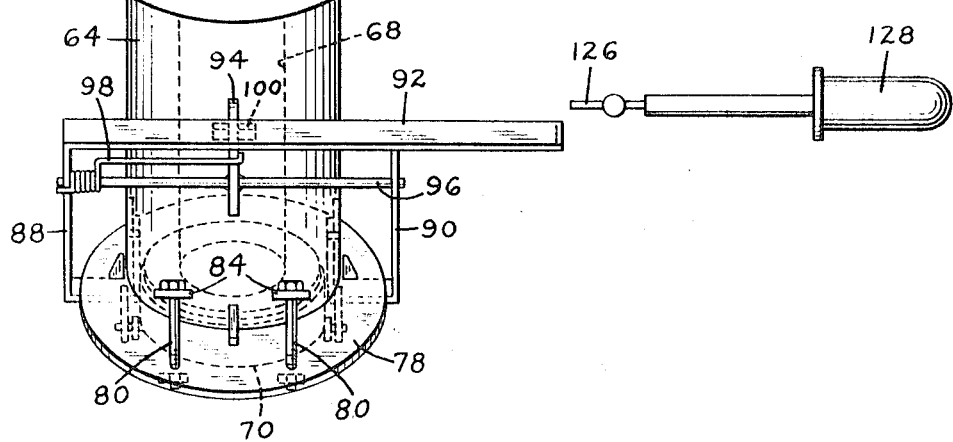

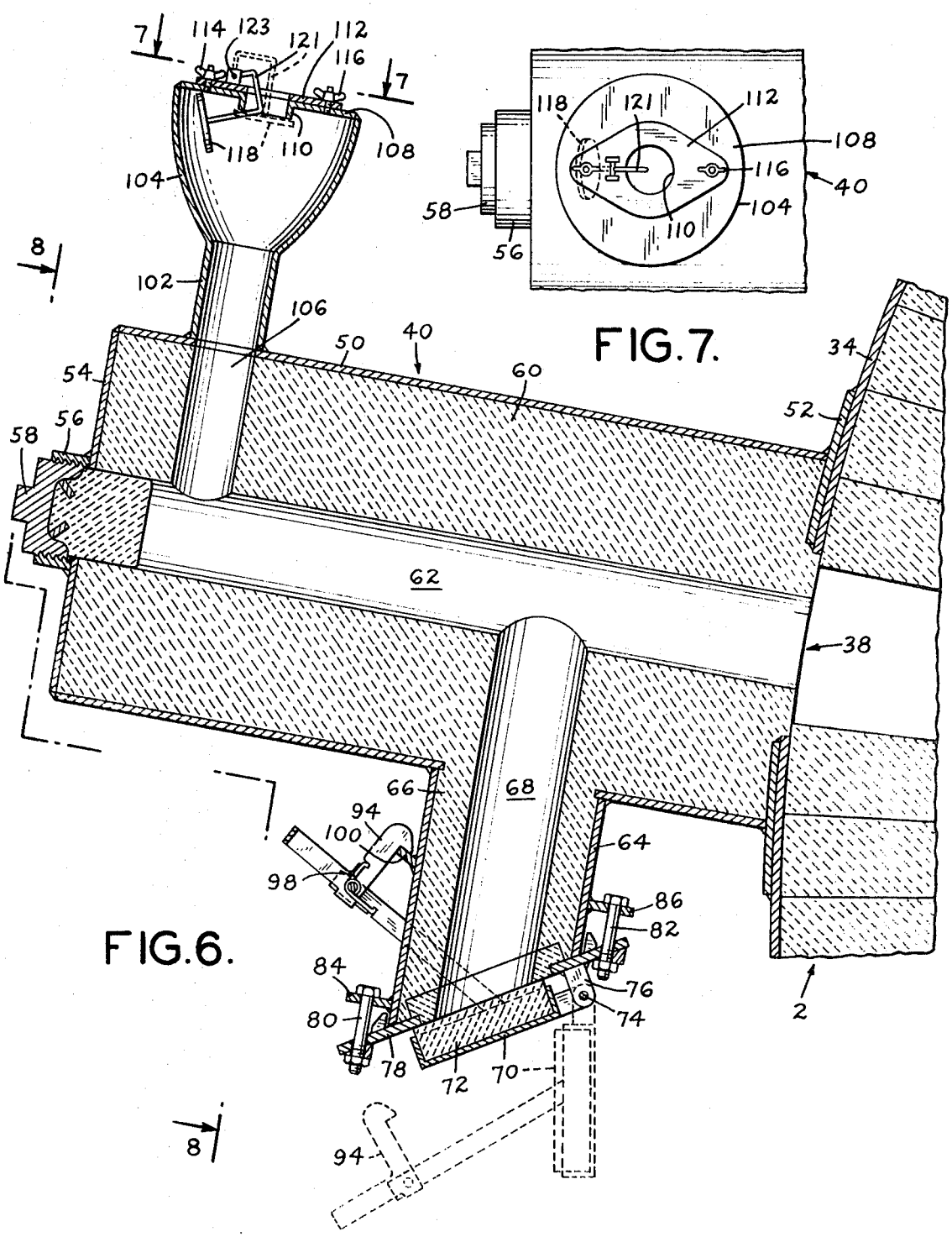

3,613,453
ROTARY KILN SAMPLING DEVICE
Kenneth R. Small and John F. Small, Dover, Pa.,
assignors to The J. E. Baker Company, York, Pa.
Filed Nov. 18, 1969, Ser. No. 877,699
Int. Cl. G01k *13/02, 13/12;* G01n *1/02*
U.S. Cl. 73—351                                    12 Claims

ABSTRACT OF THE DISCLOSURE

A method and apparatus for measuring the temperature and determining the treatment condition of material undergoing processing in a rotary kiln; the method comprising withdrawing a sample of material undergoing treatment from the rotary kiln, measuring the temperature of the sample, removing from the withdrawn sample a portion and analyzing the removed portion; the appaartus including a ceramic insulation lined sampling chamber affixed to the outer shell of the kiln and having a first passageway in communication with the interior of the kiln, and closed at its opposite end, a second passageway at right angle to said first passageway open at one end into said first passageway, a cover over the opposite end of the second passageway, means for opening and closing the cover, means for measuring the temperature of a sample in the first passageway when the cover is open, a third passageway open at one end into the first passageway, a cover over the opposite end of the third passageway, means for opening and closing the cover on the third passageway and means for receiving a sample of material discharged from the third passageway when the third passageway cover is open.

BACKGROUND

This invention relates to apparatus and methods for measuring the temperature of material undergoing processing in a kiln and for removing, from such kiln, a sample of such material and, more particularly, to such apparatus and methods for use in a rotary kiln.

Rotary kilns are used for the processing of a variety of materials wherein the material to be processed is fed into one end of the kiln, is tumbled in the kiln and, while being tumbled, is heated. The processing or treatment that such material receives in the kiln predominantly depends upon the temperatures in the kiln and the time of exposure to these temperatures, but may also be affected by the nature of the material or mixture of materials fed to the kiln, the kiln length, the rate of kiln rotation, and a variety of other factors. Due to the large number of variables, it is not practical to predict the condition of the material being processed when it is discharged from the kiln from the external data alone. Thus, measurement of the condition of the materials during their treatment is desirable.

One measurement system most commonly employed in an effort to better regulate the kiln processing and improve the processed condition of the kiln discharge is through the measurement of the temperature in the kiln. Such measurement systems include the measurement of the temperature of the gases in the kiln, of the material in the kiln undergoing treatment, or both. It is often difficult to distinguish which of these temperatures is being measured. Because, in the kiln, the materials are exposed to the radiation of the gases and the kiln walls, such temperature measurement of the material in the kiln may not be representative of the whole bed of material. In most such systems, the temperature measurement instruments rotate with the kiln. Such rotation can, and often does, effect the accuracy of the instruments, makes the instruments difficult to read and increases maintenance costs. Furthermore, the measurement of temperature, alone, is not always indicative of the treatment condition of the material where the temperature measurement is taken since other factors than temperature affect its condition.

In the instant invention, the temperature of the material undergoing treatment is not measured in the kiln but, rather, a sample of the material is withdrawn from the kiln into an insulated chamber and the temperature is measured. Just before the temperature is to be measured, the insulating chamber is uncovered, exposing the material sample in such chamber to the temperature measuring instrument. Thus, the temperature of the sample is not measured through a covered port which might become damaged or discolored and adversely affect the temperature measurement but, rather, is measured directly from the sample. Furthermore, as will be described, the temperature measuring instrument does not rotate with the kiln but is mounted in a stationary position. Hence, the temperature measuring instrument is more accurate, easier to read and cost of maintenance is reduced.

As noted above, the measurement of temperature, alone, is not always indicative of the actual treatment condition of the material, or materials, undergoing treatment. In the method and apparatus of the instant invention the sample withdrawn from the kiln for temperature measurement may be returned to the kiln in its entirety or a portion of the sample may be withdrawn from such insulated chamber for physical and chemical analysis. Such withdrawal of a portion of the sample permits not only the temperature to be measured but, in addition, permits the actual treament condition of the material undergoing treatment in the location in the kiln from which the sample is taken to also be determined. These measurements of temperature and physical and chemical analysis which, as will be described, may be taken at a number of points along the length of the treatment zones of the kiln may be utilized by the kiln operator to regulate the kiln and the treatment taking place therein or may be fed, automatically, into an automated kiln control system to so regulate such kiln.

An important aspect of the invention has been the provision of a sampling device which can be attached to the kiln at any point which may be desired and which device fills with material from the kiln and then purges itself once each revolution of the kiln. Thus the material in the kiln bring the device to its own temperature so that the device itself has no cooling effect on the material. The temperature which is read each revolution of the kiln is therefore essentially the temperature of the load in the kiln at the location of the device.

The continuous filling and emptying of the sampling device of the invention helps keep the opening from the kiln into the device clear and prevents it from being closed by coating developed in the kiln.

The instant invention will be more fully understood from the following description and appended drawings in which FIG. 1 shows, diagrammatically, a rotary kiln of the type to which the instant invention might be applied;

FIG. 2 is an enlarged sectional view, taken at 2—2, FIG. 1, showing the adoption of the instant invention to a kiln of the type shown in FIG. 1;

FIG. 3 is a view similar to FIG. 2 but showing the kiln in a further position;

FIG. 4 is an enlarged view, broken away, and taken from the inside of the kiln, showing the sampling chamber entry from the inside of the kiln;

FIG. 5 is a sectional view taken at 5—5, FIG. 4;

FIG. 6 is an enlarged sectional view, broken away, showing the sampling chamber and associated accessories of FIGS. 2 and 3;

FIG. 7 is a view taken at 7—7, FIG. 6; and

FIG. 8 is a view taken at 8—8, FIG. 6.

As will be apparent, from the following description, the apparatus and method of the instant invention may be applied to a wide variety of rotary kilns, for treatment of different materials and combinations of materials in a variety of treatment steps. The apparatus and method may be employed at one position along the kiln length or at a number of positions depending upon the type of kiln and the materials and treatments to be accomplished in such kiln. For purposes of illustration, in the following description it will be assumed that the material to be treated is to be dried in the kiln after it is fed into the kiln, is then to be calcined, then burned and finally discharged. It is also assumed that the kiln is of a length and capacity to accomplish such treatments and that the apparatus and method of the instant invention are applied to the kiln at three locations, FIG. 1, A, the end of the drying zone, B, the end of the calcining zone and C, the end of the burning zone. It is to be understood, however, that additional applications of the invention may be added to the kiln or applications might be omitted.

Referring to FIG. 1, the kiln includes a barrel, generally designated 2, mounted, in conventional manner, on supports 4, 6, 8, 10, 12 for rotation in bearing rings 14, 16, 18, 20, 22 and driven, in conventional manner and in the direction of the arrow, FIG. 2, through ring gear 24. At its upper, or elevated, end barrel 2 has an outlet 26 for exit gas and an inlet 28 for feeding materials to be treated or processed into barrel 2 and at its opposite or lower, end, outlet 30 for the discharge of the treated material. Hot gases, or fuel to be burned in barrel 2, enters barrel 2 at lower end 32.

As best shown in FIGS. 2, 3, 4 and 5, barrel 2 includes outer metal shell 34 and an inner lining of fire brick-type insulation 36. Except for opening 38, where insulated sampling chamber, generally designated 40 is affixed to shell 34, the inner lining of fire brick-type insulation is continuous and such insulation is held in position on the inner wall of shell 34 by the abutment of one brick with adjoining bricks. Around opening 38, FIGS. 4 and 5, the fire brick-type insulation, in addition to abutment, is held by angle irons 42, 44, 46, 48, welded to the inner surface of metal shell 34 and engaging in recesses in the contacting bricks.

Referring to FIG. 6, insulated sampling chamber 40 includes outer metal cylindrical shell 50 welded, at its inner end at barrel 2, to flange 52, in turn welded to outer metal shell 34 of barrel 2. Plate 54 is welded to the other end of cylindrical metal shell 50 and, with nipple 56 welded thereto and plug 58 threaded into nipple 56, forms an inspection port for the outer end of insulated sampling chamber 40. Sampling chamber 40 is lined with a sleeve of ceramic insulating material 60 having a passageway 62, therein, aligned with opening 38 in barrel insulation 36 and metal shell 34. Lining 60 covers the annular edges of the openings in flange 52 and shell 34 at opening 38.

Sampling tube 64 having an inner ceramic lining 66 of insulating material, formed integral with insulated ceramic lining 60 or as a separate unit abutted therewith, is welded to cylindrical metal shell 50. Passageway 68 in ceramic insulation 66 opens, at one of its ends into passageway 62 and, at its opposite end, is closed by cover 70 having a ceramic lining 72. Cover 70 is pivotally mounted, at 74, on hinge member 76 welded to ring 78, fastened, by bolts 80, 82, to flanges 84, 86 welded to the outer surface of sampling tube 64.

As best shown in FIGS. 6 and 8, arms 88, 90 are fastened, at one of their ends, to ring 78 and are interconnected, at their opposite ends, by bar 92 which, for purposes later described, extends outwardly beyond arm 90. Latch 94 is mounted on rod 96 rotatedly connected, at its opposite ends, to arms 88, 90. Latch 94 is spring urged, by spring 98 on rod 96, into engagement with lug 100 welded to the outer surface of sampling tube 94.

Still referring to FIG. 6, tube 102, having outwardly extending funnel end 104, is welded to shell 50 in alignment with passageway 106 in ceramic insulation liner 60. The outer, funnel end, of tube 102 is closed by plate 108 welded, around its periphery to the enlarged end of funnel end 104. Plate 108 has an inwardly extending flange 110 extending inwardly into funnel end 104 and, for purposes later described, opens thereinto. Cover plate 112 is attached by wing nuts 114, 116 to plate 108. Cover 118, mounted on the end of arm 121, is pivotally connected at 123 to cover plate 112 and, as will be later described, opens and closes the opening in plate 108 by disengaging and engaging inwardly extending flange 110.

As best shown in FIGS. 2 and 3, funnel shaped sample receiving trough 120, opened along its side 122, extends arcuately and upwardly in the direction of travel of barrel 2 and is closed at its bottom and connected and open into sample receiving receptacle 124. Sampling actuator 126, FIGS. 2 and 8, is advanced into and withdrawn from the path of travel of bar 92 by power unit 128 which may be a solenoid, cylinder and piston, or other suitable means for moving actuator 126 into and out of the path of travel of bar 92, all for purposes hereinafter described.

Referring to FIGS. 2 and 3, temperature sensing unit 130, which may be a pyrometer, or other suitable radiation responsive means for measuring temperature, is mounted in fixed position adjacent to rotating barrel 2. As barrel 2 rotates and cover 118 opens, in the manner hereinafter described, radiation from the heated sample in passageway 62 passes through passageway 106, the opening in cover 108, and is sensed by radiation responsive unit 130 which, in turn, measures temperature and, if desired, transmits a temperature measurement signal to a recorder. Radiation responsive unit 130 may, if desired, transmit a signal to a temperature responsive control unit and automatically control, fuel input, material input, speed, and the like, of the kiln.

In the process of the instant invention, insulated sampling chambers, as hereinabove described, are fastened to barrel 2 at one or more stations along the barrel. Sample receiving trough 120 with actuator 126 and temperature responsive units 130 are mounted at each station, along the barrel, where an insulated sampling chamber 40 is affixed.

As shown in FIGS. 2 and 3, barrel 2 is rotated in a clockwise direction. When insulated sampling tube 40 moves from the 12 o'clock to the 3 o'clock position, passages 62, 68 and 106 are emptied. That is to say, the material from the kiln which had flowed into such passages during the preceding revolution of the barrel, flows back into the interior of barrel 2. During such time that the insulating sampling chamber is rotated, by rotation of barrel 2 from the 12 to the 3 o'clock position, cover 118 swings back, by gravity, contacts flange 110 and closes the opening in cover 108. Cover 70, if opened by actuator 126 during the preceding revolution of barrel 2, also closes by gravity and is locked in closed position of latch 94 spring urged, by spring 98, into contact with lug 100.

Insulated sampling chamber 40 moves, by rotation of barrel 2, from the 3 o'clock position to the 6 o'clcok position of FIG. 2. Especially as sampling chamber 40 approaches the 6 o'clock position, a sample of the material or materials undergoing treatment in barrel 2 flows into and fills up passageway 62. As best shown in FIGS. 2 and 3, because of the tumbling action of such material, or materials undergoing treatment, and the direction of rotation of barrel 2, such materials tend to lie in barrel 2 in the approximately 6 to 9 o'clock barrel segment.

As barrel 2 continues rotation from the 6 o'clock position toward the 9 o'clock position (FIG. 3), a portion of the materials in passageway 62 tends to flow into passageway 68. If, during such rotation, it is desired to withdraw a sample, actuattor 126 is advanced by unit 128 into the path of travel of bar 92, trips such bar, releases catch 94 and the material sample in passageway 68 drops into open side 122 of funnel 120 and falls downwardly into container 124.

Prior to dropping of material from passageway 68, cover 118 opens by gravity exposing the sample in the outer end of passageway 62 in sampling chamber 40 through the opening cover 108 and passageway 106 to the temperature responsive unit 130. The temperature of such material in passageway 62 is measured and, preferably, recorded. A limit switch may be used to initiate temperature recording. Thus, from the sample withdrawn from the kiln, a portion is discharged through passageway 68 into container 124 for physical or chemical analysis and, substantially at the same time, the temperature is measured. From such analysis, the treatment condition of the material can be determined and, if necessary, the temperature, speed, material feed, and the like, regulated by the operator or through automatic control, if automatic controls are utilized with the instant apparatus.

Applying the method and apparatus of the instant invention to the three zone kiln of FIG. 1, the dry weight of the material or materials to be treated is known and the calcined weight and burned weight can be determined. The apparatus of the instant invention is positioned on the kiln at the end of the drying zone, the calcining zone and the burning zone where, under ideal control conditions, the desired condition of the material, or materials, undergoing treatment in the kiln should occur. Thus, in the embodiment illustrated in FIG. 1, the units of the instant apparatus would be used, one each at points A, B and C. In any particular installation, the number of units and their location would be selected as desired.

It will be understood, of course, that any desired chemical or physical analysis of the material withdrawn from the kiln can be made. For example, in the case of dolomite density is the primary physical property of interest. If a phosphate is being treated, extent of chemical reaction might be of primary interest.

With the kiln in operation, on each kiln revolution, a sample of the material undergoing treatment at each of the points A, B and C, is withdrawn from the kiln into the sampling chamber. The sample in the chamber is exposed, the temperature is measured, the sampling chamber is then reclosed and the sample is returned to the kiln. There is no spillage of the material undergoing treatment from the kiln nor is ambient air admitted to the kiln. At prescribed intervals, or at random, a sample of the material undergoing treatment can be withdrawn at each of the points A, B and C and the treatment condition or other desired property or properties of such withdrawn sample can be determined. If necessary, the kiln can be regulated to speed up or slow down the treatment as determined by the sample. This might be done by the kiln operator observing the temperature and samples or by automatic equipment responsive to temperature and the sample condition. For example, the temperatures and sample weights might be transmitted directly into computerized control equipment which, in turn, would make adjustments, as required, in the kiln operation.

The terms and expressions which have been employed are used as terms of description and not of limitation, and there is no intention in the use of such terms and expressions of excluding any equivalents of the features shown and described or portions thereof, but it is recognized that various modifications are possible.

What is claimed is:

1. In a method to determine the progress of the treatment of material in a rotary kiln, the steps comprising withdrawing from said kiln, as said kiln is rotating, a sample of the material undergoing treatment therein, measuring the temperature of said sample, returning said sample, after said temperature is measured, to said kiln, removing from the sample withdrawn from the kiln for temperature measurement, a portion and subjecting said portion to selected testing.

2. A method, as recited in claim 1, in which said samples are withdrawn, the temperature is measured and the samples are returned at a plurality of points spaced along the length of said kiln as said kiln is rotating.

3. In a method to determine the progress of the treatment of material in a rotary kiln, the steps of withdrawing from said kiln, as said kiln is rotating, at spaced points therealong and once each revolution of said kiln a sample of the material within said kiln at each of said points, measuring the temperature of each of said samples, returning each of said samples to said kiln once each revolution of said kiln, periodically withdrawing a portion of at least one of said samples before the same is returned to the kiln and subjecting said withdrawn portion to selected testing at a location remote from said kiln.

4. Apparatus for measuring the temperature of material undergoing treatment in a rotary kiln, said apparatus including a sample chamber affixed to the outer wall of said kiln and having a first passageway therein open at one of its ends into said kiln and closed at its opposite end, a second passageway in said sample chamber in alignment substantially at right angle with said first passageway and open at one of its ends into said first passageway, a cover at the opposite end of said second passageway, means for opening and closing said cover, and temperature responsive means for measuring the temperature of a sample of the material undergoing treatment in said kiln and in said sample chamber when said cover is open.

5. Apparatus, as recited in claim 4, including a third passageway in alignment substantially at right angle with said first passageway and open at one of its ends into said first passageway, a cover at the opposite end of said third passageway, said cover being pivotally mounted, at one of its sides, to said sample chamber and having a latch at its other side for engagement with a lug on said sample chamber when said cover is closed and means for releasing said latch from said lug for opening said cover.

6. Apparatus, as recited in claim 5, in which said first and third passageways and said cover on said third passageway are lined with an insulating ceramic material.

7. Apparatus, as recited in claim 6, in which said temperature responsive means is mounted adjacent to the path of rotation of said sample chamber on said rotary kiln.

8. Apparatus, as recited in claim 7, including means fixedly mounted adjacent said rotary kiln for receiving material from said third passageway when said third passageway cover is open.

9. In a rotary kiln having an opening in the wall thereof located at a selected point intermediate the charging and discharging ports thereof, a device for measuring the temperature of the material in the kiln at said selected point comprising an enclosed chamber affixed to the outer wall of said kiln adjacent said selected point and having a sample receiving passage aligned with said opening in said kiln wall, said passage being arranged to receive material from said kiln in one rotational position of said kiln and to return the received material to said kiln in another rotational position of said kiln, temperature measuring means, and means periodically to expose said temperature measuring means to material in said passage.

10. Apparatus as set forth in claim 9 in which said temperature measuring means is mounted in a position which does not rotate with said kiln.

11. Apparatus as set forth in claim 10 in which said means periodically to expose said temperature measuring means to material in said passage is actuated once each revolution of said kiln.

12. Apparatus as set forth in claim 9 comprising means to withdraw from said passage a portion of the material received therein.

References Cited

UNITED STATES PATENTS 3,379,062   4/1968   Lellep _____ 73—351

FOREIGN PATENTS 213,866      8/1957   Australia _____ 73—351
1,109,512   4/1968   Great Britain _____ 73—351

LOUIS R. PRINCE, Primary Examiner

F. SHOON, Assistant Examiner

U.S. Cl. X.R.

73—354, 421 B